Oct. 10, 1950 R. C. FERRAR ET AL 2,524,782

SELECTIVE CALLING SYSTEM

Filed Sept. 7, 1946 2 Sheets-Sheet 1

INVENTORS.
Robert C. Ferrar
BY Gerald Menhennett
Percy P. Lantzy
ATTORNEY

Oct. 10, 1950 R. C. FERRAR ET AL 2,524,782

SELECTIVE CALLING SYSTEM

Filed Sept. 7, 1946 2 Sheets-Sheet 2

INVENTORS.
Robert C. Ferrar
BY Gerald Menhennett
Percy P. Lantzy
ATTORNEY

Patented Oct. 10, 1950

2,524,782

UNITED STATES PATENT OFFICE 2,524,782

SELECTIVE CALLING SYSTEM

Robert C. Ferrar, New Providence, and Gerald Menhennett, Red Bank, N. J., assignors to Federal Telephone and Radio Corporation, New York, N. Y., a corporation of Delaware Application September 7, 1946, Serial No. 695,544

3 Claims. (Cl. 250—6)

Figure 1:
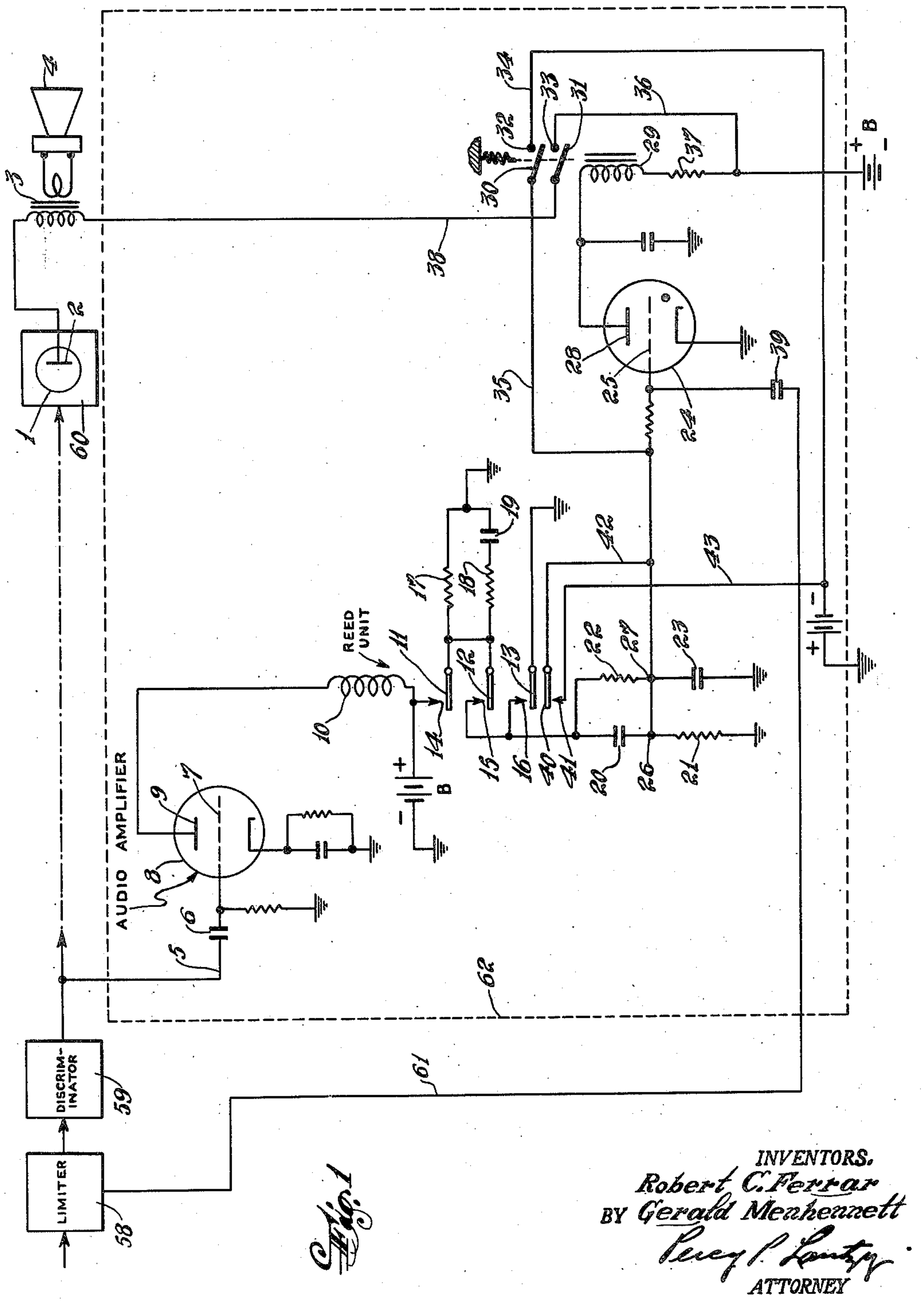

This invention relates to systems for selectively calling stations in a communication system comprising a number of stations.

The principal object is to call a particular desired station and put it into operating relation with the calling station.

Another object is to provide a selector circuit for a receiver responsive to a predetermined series of signal frequencies to render the receiver operative; and a further object is to provide such a selector circuit with a holding circuit capable of maintaining the receiver operative so long as the receiver continues to detect the carrier frequency which was modulated with said series of signal frequencies.

According to a system of communication between a central station and any of a number of outlying stations, a common frequency channel has been used for transmitting to all of the stations, the signals being transmitted by frequency modulation. Such a system is used, for example, in police communications and similar services to call a desired one of a number of remote mobile or field stations from a central control station.

Since the same frequency channel is used to call from the central station to all the other stations, it is desired that some means for calling and selecting the called station shall be used to put it into operating relation with the calling station.

According to our invention, we accomplish this by the provision at each remote or field station, of a number of vibratory elements, each being adapted to be set into vibration by a particular calling frequency. By transmitting from the central station successively those frequencies which are required to operate the vibratory elements at a given field station, suitable charging circuits associated with the vibrating elements are caused to operate a voltage-operated device to render the receiver at the called station operative.

Where it is desirable to call a group of field stations this may be accomplished by transmitting a predetermined group of signal frequencies including the frequency signals required for the desired group of stations. Where it is desirable to call all of the field stations at the same time this is preferably accomplished by transmission of a single predetermined signal frequency which will render the receivers at all field stations operative.

The foregoing and other objects and features of our invention will be more thoroughly understood from the following detailed description and the accompanying drawing which shows a system embodying our invention.

In the drawings

Figure 2:
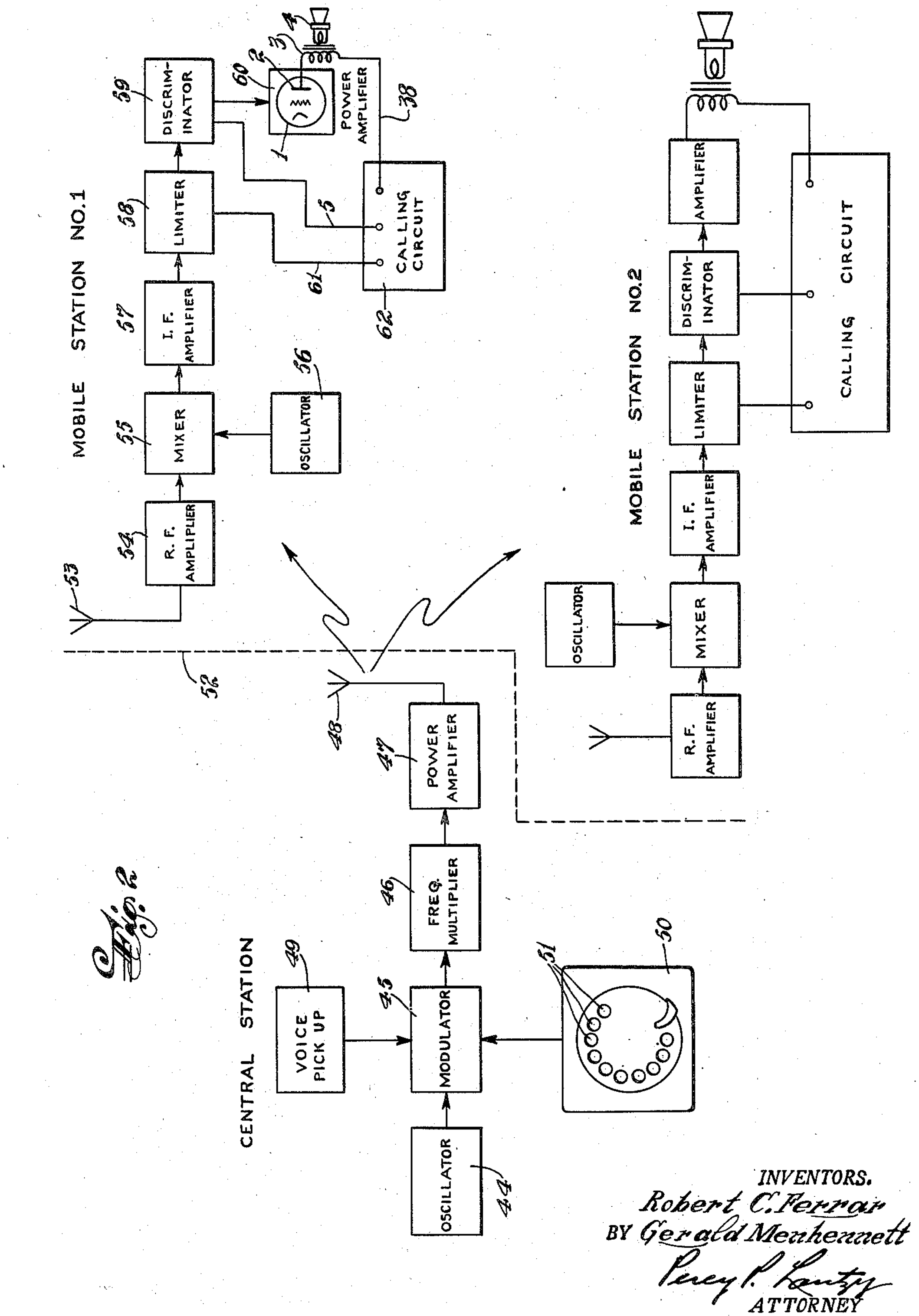

Fig. 1 shows an arrangement according to our invention, adapted to be incorporated into a receiver of the frequency modulation type; and Fig. 2 shows a complete system embodying our invention, the system comprising a central calling station and a plurality of mobile or field stations adapted to be called.

In practice there will be one of the systems shown in Fig. 1, for example, incorporated into each receiver which is to be called from the central or calling station. In Fig. 1, the tube 1 represents an audio frequency power amplifier which may be any desired type of power amplifier; and as the particular type is unimportant, all of its electrodes are not shown, but only the output electrode or anode 2. Power amplifier 1 is part of the receiver and it is coupled through an output transformer 3 to a loudspeaker 4.

Upon being called from the central station, this audio-amplifier is adapted to be made operative by the system shown connected with it. The system operates on audio-frequency and its input is connected over a lead 5 from the output of the usual discriminator of a frequency modulation receiver, through a coupling condenser 6 to the control grid 7 of an audio-frequency amplifier tube 8 of the triode type. The anode 9 has its output connected to a coil 10 which is electro-magnetically related with a number of tuned reeds of which there are shown three, these being numbered 11, 12 and 13. The reeds are each tuned to a different natural frequency in the audio-frequency range so that when the tuned frequency is sent through coil 10, the corresponding reed will vibrate against the respective reed contacts 14, 15 and 16.

Reed 11 has connected in series between it and ground a high resistance 17; reed 12 is connected to ground through a series arranged resistor 18 and condenser 19; and reed 13 is connected directly to ground. Contacts 15 and 16 are connected together and are connected to ground through two parallel paths, one of which comprises the series-connected condenser 20 and resistor 21, and the other of which comprises the series arranged resistor 22 and condenser 23.

For the purpose of controlling the audio power amplifier 1, in accordance with called signals, there is provided a thyratron tube 24, the control grid 25 of which is connected to points 26 and 27 which are the points between condenser 20 and resistor 21 and between resistor 22 and condenser 23, respectively. The output circuit of the thyratron connected to its anode 28 passes through a relay coil 29 having a pair of armatures 30 and 31 adapted to make and break contact with the respective relay contacts 32 and 33. Contact 32 has connected to it a lead 34 for supply of negative bias for tube 24. The armature 30 is connected over lead 35 to the grid 25 of the thyratron, so that when the armature closes on its contact 32, the negative bias is connected to the thyratron grid to shut off the thyratron. The armature contact 33 is connected over lead 36 to the lower end of a resistor 37 which is connected in series with relay coil 29. The relay armature 33 is connected over a lead 38 to the lower side of the primary winding of output transformer 3, so that when armature 31 connects with its contact 33, the B voltage which is supplying the thyratron is connected directly to the anode 2 of the audio power amplifier of the receiver, thereby making the power amplifier and hence the receiver, operative.

To describe the operation of the calling system, let it be assumed that reed 11 has a natural frequency of vibration at a frequency X somewhere in the low audio range, and that reeds 12 and 13 have somewhat different natural frequencies Y and Z, also in the low audio frequency range. The operator at the central station will have a number of calling keys, or dial with a plurality of keying positions, each of which will frequency modulate his transmitting carrier frequency by a sustained note somewhere preferably in the low audio range. To call the particular station represented in the drawing, which has the particular reeds with frequencies X, Y and Z, the operator will first dial or push his key for the X audio frequency; and when the receiver picks up the signal frequency modulated by the X signal, the discriminator will separate out the X frequency in the usual way and send it to audio amplifier 8. Since the reed-operating coil 10 will carry this note, it will vibrate the reed 11 without vibrating either of reeds 12 or 13 since the latter two reeds are not naturally resonant at this frequency X. While reed 11 is vibrating, it will rapidly make and break contact with contactor 14 and the B voltage connected to the lower end of coil 10 will send a charging current through resistor 18 and condenser 19 to charge up the condenser 19, in a brief time. This charge on the condenser will leak off in a short period of time of say two or three seconds through resistors 18 and 17 which are in series across the condenser, the actual time depending on the time constant of the circuit.

Before the charge leaks off condenser 19, however, the operator will dial or push the next call signal Y, which will cause reed 12 to vibrate against its contactor 15 at the low audio rate, and this will cause a current from the charged condenser 19 to pass through condenser 20, thereby charging up condenser 20, the charging circuit for condenser 20 being through the parallel-arranged elements 21 and 23 and the conductive grid-cathode circuit of the thyratron tube 24. The charge on condenser 20 will gradually leak off through the resistance connected across it, but before this happens, the operator at the calling station will dial or push his Z button to vibrate reed 13 against its contact 16, thereby connecting the positively polarized upper end of the condenser 20 to ground intermittently, and causing the upper end of condenser 23, and the thyratron grid connected to it, to be driven negative with respect to ground and the thyratron cathode. Since the charging path for condenser 23, through condenser 20 and the contacts of reed 13 is of much lower resistance than the discharge path through resistor 21, the upper side of condenser 23 and the thyratron grid will almost immediately assume a D.-C. voltage which is below ground potential; and hence the conduction which is otherwise occurring within the thyratron tube will cease.

The cessation of conduction in the thyratron causes the D.-C. current in the relay coil 29 to drop to zero, so that the armatures 30 and 31 will drop back to their normal position of closed contact with their respective contacts 32 and 33. The closure of these relay contacts performs two functions; the closure of armature 31 with contact 33 applies B voltage to the plate of the audio power amplifier, causing the signals at the transmitting or central station to be heard in the speaker 4. The closure of armature 30 against contact 32 applies a constant negative voltage to the thyratron grid, thereby causing the thyratron to remain in a non-conducive state. When the carrier is shut off at the time that the operator at the central station discontinues the signal, the cessation of the carrier at the limiter grid causes thermal agitation noise output from the limiter stage of the receiver. This noise voltage is applied through condenser 39 to grid 25 thereby trigging thyratron tube 24, and allowing the thyratron to begin to conduct again. This conduction produces current in relay coil 29, pulling in the two armatures 30 and 31 again, and thereby rendering the audio power amplifier again inoperative.

In the operation of the system, some care must be taken in the timing of the transmitted call tones. It is desired, of course, that the capacitors 19 and 20 shall loose their charge within a fairly short time, in order that undesired responses of the receiver shall not be had to other tone calls than the X, Y and Z calls. It will be recognized, for example, that if the condensers should hold their charge for a considerable time, the station would be called by the creation of the X, Y and Z tones, even though a number of other tones have intervened. For example, suppose the operator were to call a remote station, one of whose call tones was at the X frequency; capacitor 19 would then be charged and if not permitted to discharge soon, would cause energization of the speaker when the Y and Z tones were subsequently transmitted by the control station in calls to other remote stations. In order to prevent such unintentional responses, it is desired that the resistors 17 and 22 shall be of small enough value to discharge their respective condensers 19 and 20 within the desired time.

Due to the presence of resistor 17 and resistor 22 in shunt with condensers 19 and 20, respectively, it will be required in order to complete the call, that the X, Y and Z tones be transmitted from the transmitting station with only short intervals between them, otherwise the charges on the condenser necessary to the completion of the call will have leaked off before the call is completed. Practically, the proper time sequence between the successive tones can be accomplished by pre-selecting the three tones to be transmitted, for example by a bank of push button switches, and then transmitting them at mechanically timed intervals. In practice, however, the timing is not so critical that it cannot easily be done manually. A preferred method, of course, is to employ a dial, similar to a telephone dial, for selective calling, the three combination tone signal being keyed by three dialing operations, the dial for example having ten or more selectable frequencies.

Although ordinarily the removal of the carrier at the central calling station will disestablish the communication with the called station, so that it will be necessary to call it again to reestablish communication, it is possible by a very simple adjustment to arrange the system so that once the two-way contact is established, subsequent transmissions may be made between the two stations without putting in the call again. This may be done by a suitable switching means connecting member 30 with member 32 after the receiving station has been called, so that this contact will be established even though the armature breaks away from its contact 32. This may be done conveniently, for example, by means of the usual hook on which the microphone at the receiving or remote station is hung when not in use. Lifting the microphone or other element to respond to the initial call from the control station, will thus establish contact between members 30 and 32, making the receiver operation dependent merely on the presence or absence of an incoming carrier, regardless of whether the audio tones are transmitted.

Although the circuit elements are not especially critical, and considerable latitude in the choice of values is permissible, the following is a set of values which has been found suitable in practice:

| | | |
|---|---|---|
| Resistor 17 | megohms | 20 |
| Resistor 18 | ohms | 5000 |
| Resistor 22 | meghoms | 20 |
| Resistor 21 | do | 1 |
| Condenser 19 | microfarads | .1 |
| Condenser 20 | do | .1 |
| Condenser 23 | do | .1 |

It will be recognized that the invention may be used to call individually any one of a number of stations, the number being dependent only on the number of reeds per station, and the number of audio-frequency call signals per system. If N be the number of reeds per station, and T the number of call tones available at the control station, the number of remote stations which may be individually called is:

$$T(T-1)^{N-1}$$

It is not necessary that the reeds in any given remote station be all of different frequencies, although no two reeds which operate in immediate succession should be at the same frequency. Thus, reeds 11 and 13 could be at the same or different frequencies, although reed 12 should have a natural frequency different from either reed 11 or 13.

In the operation of systems of this character it is sometimes desirable to call a particular group of field stations and at other times it is desirable to call all of the field stations simultaneously. To call a particular group it is only necessary to transmit, in the case of three reed signalling circuits, one additional frequency thereby providing in the four frequency signal several three frequency signal combinations. This may also be increased by adding still another frequency to the combination signal.

When all field stations are to be called all of the signal frequencies could be transmitted but it is preferable to provide a much simpler signalling arrangement and this is accomplished by including a fourth vibratory element 40 for actuation by coil 10 in response to a predetermined frequency at which element 40 is resonant. The element 40 is connected in circuit with the associated contact 41 between the grid 25 by connection 42 and a negative voltage source by connection 43.

It should be understood that the invention is not limited to the particular arrangement shown, but that other modifications and variations may suggest themselves in particular instances. Although the system has been shown with four tuned reeds, it will be understood that a different number of reeds might be used if desired. Furthermore, any number of call tones may be provided at the central station, it being required only that there be sufficient call tones for all the call stations; and to prevent undesired calling of the station, the succession of call reeds should differ among the stations.

Fig. 2 illustrates how a number of field or mobile stations may be called from a central or control station. The central station is substantially a conventional form of frequency modulation transmitter, comprising an oscillator 44 connected to the input of a modulator 45, the output of which is connected to a frequency multiplier 46 and thence to a power amplifier 47 which is connected to a radiating antenna 48. According to conventional practice, some form of a voice pickup device 49 is connected to the modulator. For the purpose of producing the call frequencies such as the frequencies X, Y and Z, and other similar calling frequencies, there is provided a dial 50 having a number of keying positions 51, each keying operation serving to impress on the modulator 45 a different one of the call tones. Thus, to call the call tones X, Y and Z in succession, the dial keying positions X, Y and Z will be dialed in that order and the signal modulated by these call frequencies, will thus be transmitted.

At the right of the dotted line 52 in Fig. 2, there are shown two of the field or mobile stations, these being designated "Mobile Station No. 1" and "Mobile Station No. 2," respectively. Each of the mobile stations will ordinarily be composed of the same elements, and accordingly it will only be necessary to describe one of them. Thus, mobile station 1 comprises a receiving antenna 53, a radio frequency amplifier 54, a mixer 55, an oscillator 56 connected to the mixer in a conventional manner, an intermediate frequency amplifier 57, a limiter 58, a discriminator 59, and a power amplifier 60. The power amplifier contains the stage 1 which is shown in Fig. 1, and its anode 2 is connected to the output transformer 3 and thence to the loudspeaker 4, these elements also being shown in Fig. 1. The limiter stage 58 is connected through wire 61 and condenser 39 to grid 25 of thyratron 24. The calling circuit is represented by the rectangle 62 which contains all of the elements contained in the dotted rectangle, also numbered 62 in Fig. 1. The leads 5, 61 and 38 from the discriminator, the limiter and the anode circuit of the power amplifier, respectively, are connected to the calling system 62 in the manner in Fig. 1.

Thus, when the operator at the central station closes in the proper succession, the keys 51 for the mobile station 1, this latter station will be put into operation; and similarly when he closes in sequence the keys for mobile station No. 2, the No. 2 station will be put into operation. Similarly all the other stations in the system can be put into operation by proper selection and sequence of operation of the calling keys or by operation of a single master key, all stations may be called simultaneously.

While we have disclosed particular apparatus for carrying out our invention, it should be understood that such apparatus is submitted as illustrative of the invention only and not as a limitation on the scope thereof.

We claim:

1. Means for calling a frequency modulated receiving station having a number of stages comprising an amplifier stage, said means comprising a plurality of vibratory elements each being responsive to a calling frequency, a relay coil responsive to received calling signals for vibrating the elements, a condenser in circuit with each vibratory element, each condenser being included in a charging circuit and receiving a charge when its respective vibratory element is vibrating, connections whereby the condensers are charged successively in response to the successive operation of the vibratory elements by the presence of successive calling frequencies, an electric conduction system in circuit with the last of the condensers, said system comprising a vacuum tube having a control electrode connected to receive a bias from said last condenser, such that when said last condenser is charged, the conduction is stopped, a relay connected with said system and a pair of armatures responsive to said relay, one of said armatures being in circuit with a power supply of said amplifier stage to render said power supply operative when the conduction is stopped, and the other of the armatures being in circuit with a source of voltage which applies a sufficiently negative bias to the said vacuum tube to maintain the conduction stopped so long as a carrier signal supplying said voltage is received by the receiver.

2. In a frequency-modulated receiving station, means for receiving a call sent to the station in the form of a plurality of designated modulation frequencies, said means comprising a plurality of vibratory elements each being resonant to a predetermined one of the calling modulation frequencies, means for vibrating the elements in response to receipt of said call frequencies, an individual condenser connected to be charged by vibration of the individual vibratory element, each of said condensers being included in circuit with a resistance, a first of the condensers being charged by the call frequency which is first received, a second of the condensers receiving a charge from the first condenser responsive to the receipt of the call frequency of the second condenser, an electric conduction system in circuit with the last of the successively charged condensers, said system comprising a thyratron tube having a control electrode whose bias is dependent on the charge on the last condenser, such that when the last condenser is charged, the conduction is stopped, and means connected to the output of the thyratron operative responsive to stopping of conduction for rendering the receiving station operative to receive the call, and means for maintaining the receiving station operative as long as a received carrier signal is present.

3. A system for calling a frequency-modulated receiving station from a frequency-modulated transmitting station which comprises means for transmitting selected ones of a plurality of modulation calling signals from the transmitting station, means at the receiving station for receiving and demodulating the modulation calling signals, and a plurality of vibratory elements resonant at predetermined frequencies of the calling signals, whereby respective ones of the vibratory elements vibrate when the respective calling signals are received, a first condenser in circuit with the first vibratory element and connected to be charged when the first vibratory element vibrates, a second condenser in circuit with the second vibratory element and connected to receive a charge from the first condenser when the second vibratory element vibrates, and a third condenser in circuit with a third vibratory element and connected to receive a charge from the second condenser when the third vibratory element vibrates, a discharging circuit in circuit with each condenser to allow the charge to leak off after a time, whereby when the vibratory elements are vibrated in their successive order before the charges have leaked off, the third condenser is charged, an electric conduction system having in an output circuit means for rendering the receiving station inoperative so long as the conductions exist, and a connection from the third condenser to the conduction system for stopping the sonduction responsive to the charge of the third condenser.

ROBERT C. FERRAR.
GERALD MENHENNETT.

REFERENCES CITED

The following references are of record in the file of this patent:

UNITED STATES PATENTS

| Number | Name | Date |
|---|---|---|
| 1,572,756 | Smythe et al. | Feb. 9, 1926 |
| 1,635,779 | Carter | July 12, 1927 |
| 1,941,067 | Armstrong | Dec. 26, 1933 |
| 2,202,432 | Santucci | May 28, 1940 |
| 2,245,652 | Dickert | June 17, 1941 |
| 2,250,596 | Mountjoy | July 29, 1941 |
| 2,255,162 | Hart | Sept. 9, 1941 |
| 2,314,707 | Katzin | Mar. 23, 1943 |
| 2,321,651 | Caraway | June 15, 1943 |
| 2,325,829 | Boswau | Aug. 3, 1943 |
| 2,334,876 | Janson | Nov. 23, 1943 |
| 2,340,798 | Deal | Feb. 1, 1944 |
| 2,349,870 | Koch | May 30, 1944 |
| 2,368,778 | Purington | Feb. 6, 1945 |
| 2,381,754 | Jadraque et al. | Aug. 7, 1945 |
| 2,392,672 | Koch | Jan. 8, 1946 |
| 2,431,167 | Byrnes | Nov. 18, 1947 |